(12) United States Patent
Trinidad

(10) Patent No.: US 10,921,203 B1
(45) Date of Patent: Feb. 16, 2021

(54) COMMUNICATION SYSTEM WITH IMMERSION COUNTER

(71) Applicant: Harris Global Communications, Inc., Rochester, NY (US)

(72) Inventor: Michael Trinidad, Honeoye Falls, NY (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 0 days.

(21) Appl. No.: 16/689,817

(22) Filed: Nov. 20, 2019

(51) Int. Cl.
| | |
|---|---|
| G01L 7/02 | (2006.01) |
| G04F 8/00 | (2006.01) |
| H04B 1/3827 | (2015.01) |
| H04B 1/38 | (2015.01) |

(52) U.S. Cl.
CPC ............ G01L 7/024 (2013.01); G04F 8/00 (2013.01); H04B 1/3827 (2013.01); H04B 2001/3894 (2013.01)

(58) Field of Classification Search
CPC ............ G01L 7/024; H04B 1/3827; H04B 2001/3894; G04F 8/00
See application file for complete search history.

(56) References Cited

U.S. PATENT DOCUMENTS

| | | | | |
|---|---|---|---|---|
| 4,188,825 A * | 2/1980 | Farrar | ............ | B63C 11/32 368/1 |
| 4,526,473 A * | 7/1985 | Zahn, III | ............ | G04B 47/00 340/309.16 |
| 4,533,256 A * | 8/1985 | Ostendorf | ............ | G04G 21/02 368/10 |
| 4,611,923 A * | 9/1986 | Kawahara | ............ | G04G 21/02 368/10 |
| 4,703,139 A * | 10/1987 | Dunlap | ............ | H01H 13/7006 200/275 |
| 4,783,772 A * | 11/1988 | Umemoto | ............ | B63C 11/02 368/11 |
| 4,882,678 A * | 11/1989 | Hollis | ............ | B63C 11/32 73/865.1 |
| 5,753,833 A * | 5/1998 | Mitaki | ............ | B63C 11/02 128/201.27 |
| 6,360,182 B1 * | 3/2002 | Hales | ............ | A62B 18/08 702/139 |
| 7,192,621 B2 | 3/2007 | Motegi | | |
| 7,778,115 B2 * | 8/2010 | Ruchonnet | ............ | G01L 7/163 368/101 |
| 8,446,264 B2 | 5/2013 | Tanase | | |
| 8,847,742 B2 | 9/2014 | Tanase | | |
| 9,229,571 B2 * | 1/2016 | Ciesla | ............ | G06F 1/1626 |

(Continued)

*Primary Examiner* — Lewis G West
(74) *Attorney, Agent, or Firm* — Fox Rothschild LLP; Robert J. Sacco; Carol E. Thorstad-Forsyth

(57) ABSTRACT

Systems and methods for operating a communication device. The methods comprise: monitoring, by the processor, states of snap-dome based switches of a keypad provided with the communication device; activating, by the processor, a first timer when the snap-dome based switches are simultaneously activated; detecting, by the processor, when maintenance of the communication device is needed based on a value of the first timer; and causing, by the processor, performance of communication device maintenance based on the detecting, for immersion time and immersion depth fatigue.

22 Claims, 3 Drawing Sheets

(56) References Cited

U.S. PATENT DOCUMENTS

| | | | |
|---|---|---|---|
| 9,280,224 B2* | 3/2016 | Yairi | G06F 3/041 |
| 9,588,683 B2* | 3/2017 | Yairi | F04B 45/073 |
| 2003/0160712 A1* | 8/2003 | Levy | H01H 13/702 |
| | | | 341/22 |
| 2004/0031673 A1* | 2/2004 | Levy | H01H 13/88 |
| | | | 200/521 |
| 2010/0154238 A1* | 6/2010 | Harshbarger | G01B 7/26 |
| | | | 33/836 |
| 2011/0193787 A1* | 8/2011 | Morishige | G06F 3/016 |
| | | | 345/173 |
| 2011/0205081 A1 | 8/2011 | Chen et al. | |
| 2018/0128650 A1* | 5/2018 | Bruwer | G01D 5/2006 |

\* cited by examiner ature, advantage, or characteristic described in connection with an embodiment is included in at least one embodiment of the present invention.

COMMUNICATION SYSTEM WITH IMMERSION COUNTER

BACKGROUND

Statement of the Technical Field

The present document concerns communication systems. More particularly, the present document concerns systems and methods providing a communication system with an immersion counter.

Description of the Related Art

Conventional communication devices include radios (e.g., Land Mobile Radios ("LMRs")). Some of the radios have extreme immersion requirements, such as a twenty meter immersion requirement. Such radios have certain components that need maintenance due to fatigue after a certain number of dives at certain pressures and for certain amounts of time.

SUMMARY

This document concerns systems and methods for operating a communication device. The methods comprise: monitoring, by the processor, states of snap-dome based switches of a keypad provided with the communication device; activating, by the processor, a first timer (e.g., a dive depth timer) when the communication device is in a dive mode and/or the snap-dome based switches are simultaneously activated; detecting, by the processor, when maintenance of the communication device is needed based on a value of the first timer; and causing, by the processor, performance of communication device maintenance based on the detecting.

In some scenarios, the first timer comprises a clock for tracking an amount of time in which the communication device is immersed in water at given depths during a single immersion event or during a plurality of consecutive immersion events. A detection that maintenance is needed may be made when the value of the first timer is equal to or greater than a threshold value. The threshold value may be selected in accordance with a maximum amount of time at least one pressure sensitive component of the communication device can be immersed in water at given depths without experiencing fatigue, failure or erasure.

In those or other scenarios, the methods also comprise: transitioning the communication device from a non-dive mode in which dive timing operations of the communication device are disabled to the dive mode in which dive timing operations of the communication device are and/or are to be enabled; and activating a second timer (e.g., dive mode timer) in response to said transitioning. As noted above, the first timer comprises a clock for tracking an amount of time in which the communication device is immersed in water at given depths. The second timer comprises a clock for tracking an amount of time in which the communication device is in the dive mode. The first timer may be deactivated when the snap-dome based switches are no longer simultaneously activated, and the second timer may be deactivated when the communication device is transitioned from the dive mode. The first timer and/or second timer can be reset when the communication device maintenance has been performed.

BRIEF DESCRIPTION OF THE DRAWINGS

This disclosure is facilitated by reference to the following drawing figures, in which like numerals represent like items throughout the figures.

DETAILED DESCRIPTION

Figure 1:
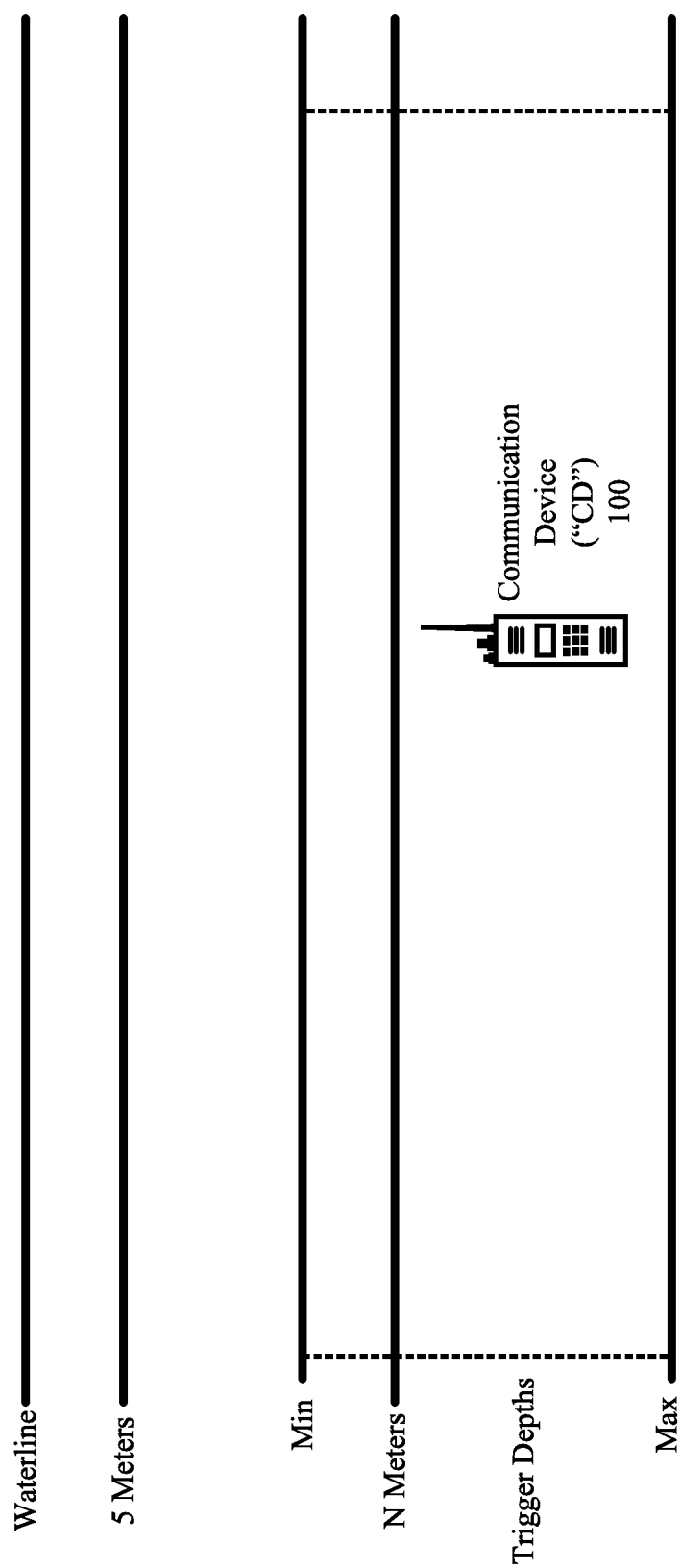
FIG. 1 is an illustration of an illustrative environment in which a communication device may be used.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The terms "memory," "memory device," "data store," "data storage facility" and the like each refer to a non-transitory device on which computer-readable data, programming instructions (e.g., instructions 250 of FIG. 2) or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

As noted above, conventional communication devices include radios. Some of the radios have extreme immersion requirements, such as a twenty meter immersion requirement. Such radios have certain components that need maintenance due to fatigue after a certain number of dives at certain pressures and/or for certain amounts of time at certain pressures. Currently, there is not a way to accurately keep track of a radio's immersed time at depths capable of material fatigue.

Radios that require maintenance based on time spent at immersed depths due to fatigue of components have no accurate measurement system in place to determine when maintenance is needed. Currently, systems only track the number of times a radio is put in a dive mode. There is no understanding of whether or not the radio was then subjected to any immersion. If immersed, there is no information as to how long the radio was immersed at pressures capable of fatiguing the equipment.

Accordingly, this document concerns implementing systems and methods addressing these drawbacks of conventional radios. More specifically, this document concerns systems and methods for operating a communication device with a dome switch keypad. The dome switch keypad generally provides a pressure switch (e.g., a switch that changes an operational state when hydrostatic pressure of a certain amount is applied thereto). The pressure switch comprises a highly reliable, electrically passive (no power consumption) submersible switch capable of (a) precision triggering in certain depths and (b) deep depth survival. The purpose of the submersible switch is that is uses pressure from water submersion to activate (i.e., change states from an off state to an on state, and vice versa). The submersible switch activation can be accomplished at select depths that cause fatigue of the communication device's components (e.g., a pressure vent, a seal, and/or breathing ports/vents). For example, as shown in FIG. 1, the submersible switch of the communication device 100 is designed to be activated when it reaches ten meters below the water's surface. This activation at ten meters is repeatable (i.e., the submersible switch is reliable in that it will trigger at ten meters each time it is re-submerged under water). The present solution is not limited to the particulars of this example.

During operation, the communication device 100 performs operations to: monitor states of snap-dome based switches of a keypad provided with the communication device; activate a first timer (e.g., a dive depth timer) when the communication device is in a dive mode and/or the snap-dome based switches are simultaneously activated; detect when maintenance of the communication device is needed based on a value of the first timer; and cause performance of communication device maintenance based on the detecting.

In some scenarios, the first timer comprises a clock for tracking an amount of time in which the communication device is immersed in water at given depths during a single immersion event or during a plurality of consecutive immersion events. A detection that maintenance is needed may be made when the value of the first timer is equal to or greater than a threshold value. The threshold value may be selected in accordance with a maximum amount of time at least one pressure sensitive component of the communication device can be immersed in water at given depths without experiencing fatigue, failure or erasure.

In those or other scenarios, the communication device 100 also performs operations to: transition itself from a non-dive mode in which dive timing operations of the communication device are disabled to the dive mode in which dive timing operations of the communication device are and/or are to be enabled; and activate a second timer (e.g., dive mode timer) in response to said transitioning. As noted above, the first timer comprises a clock for tracking an amount of time in which the communication device is immersed in water at given depths. The second timer comprises a clock for tracking an amount of time in which the communication device is in the dive mode. The first timer may be deactivated when the snap-dome based switches are no longer simultaneously activated, and the second timer may be deactivated when the communication device is transitioned from the dive mode. The first timer and/or second timer can be reset when the communication device maintenance has been performed.

Figure 2:
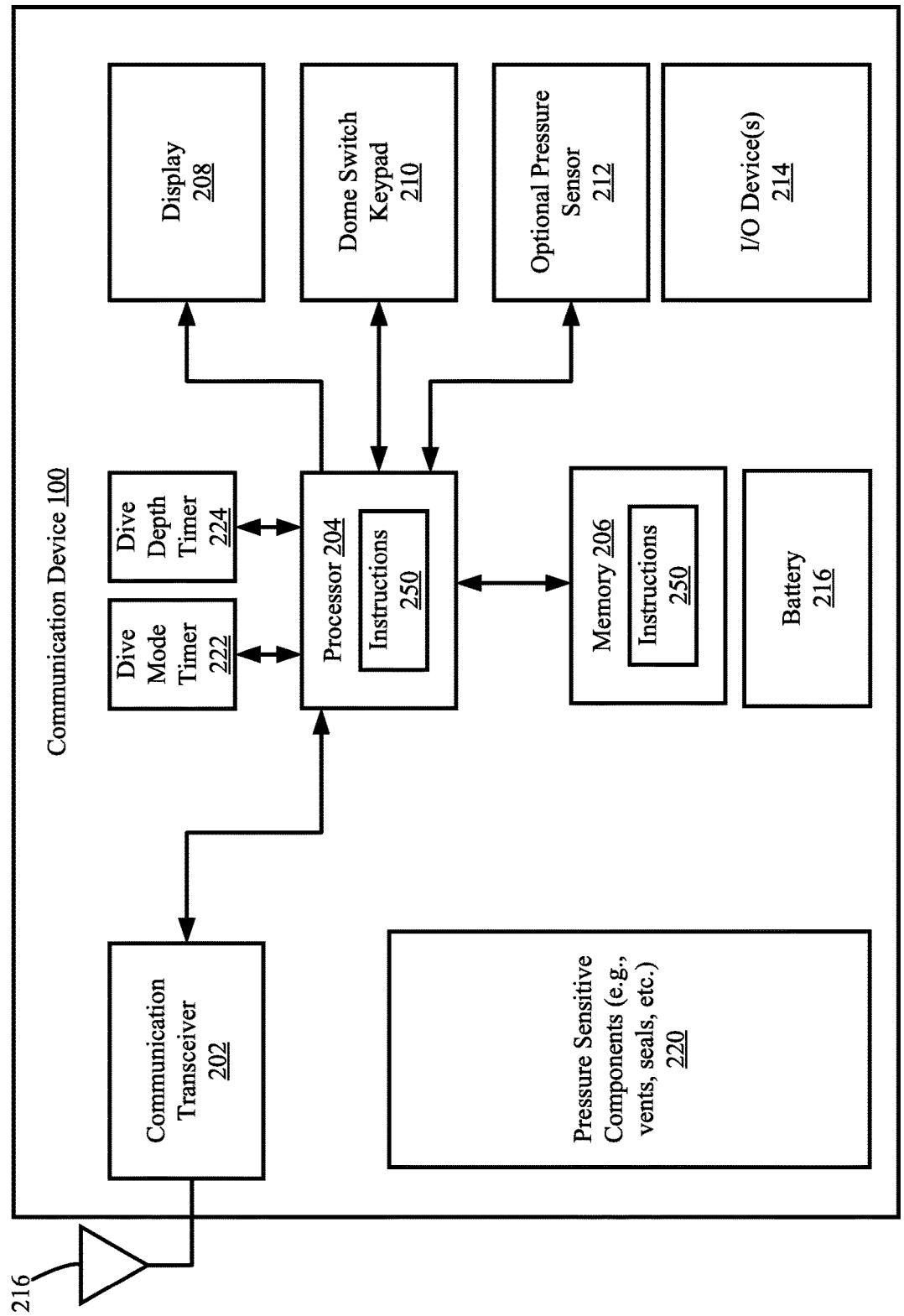
FIG. 2 is an illustration of an illustrative communication device architecture.

Referring now to FIG. 2, there is provided an illustration of an illustrative architecture for the communication device 100 which is configured for carrying out the various methods described herein for accurately determining when maintenance thereof is needed. Communication device 100 can include more or less components than that shown in FIG. 2 in accordance with a given application. For example, communication device 100 may or may not include one or more optional pressure sensors 212. Pressure sensors are well known in the art, and therefore will not be described herein. The present solution is not limited in this regard.

As shown in FIG. 2, the communication device 100 comprises a communication transceiver 202 coupled to an antenna 216. Communication transceivers are well known in the art, and therefore will not be described in detail herein. Still, it should be understood that the communication transceiver can comprise one or more components such as a processor, an application specific circuit, a programmable logic device, a digital signal processor, or other circuitry programmed to perform the functions described herein. The communication transceiver 202 can enable end-to-end communication services in a manner known in the art. In this regard, the communication transceiver can facilitate communication of voice data from the communication device 100 over a communication network (e.g., a Land Mobile Radio network, a cellular network, and/or other network).

The communication transceiver 202 is connected to a processor 204 comprising an electronic circuit. During operation, the processor 204 is configured to control the communication transceiver 202 for providing communication services. The processor 204 also facilitates an accurate determination as to when maintenance of the communication device 100 is needed. The manner in which the processor facilitates such a determination will become evident as the discussion progresses.

A memory 206, display 208, dome switch keypad 210, optional pressure sensor 212, and Input/Output ("I/O") device(s) 214 are also connected to the processor 204. Each of the listed devices are well known in the art, and therefore will not be described herein. In some scenarios, the dome switch keypad 210 comprises a dome switch keypad available from Snaptron Inc. of Colorado, USA. As known, a dome switch keypad comprises a plurality of keys each comprising a snap-dome based switch. The snap-dome based switch uses two circuit board traces in conjunction with a metal dome to detect when the respective key is being depressed. Such a detection is made when the metal dome is in contact with the two circuit board traces. When the key is no longer being depressed, the metal dome moves out and away from the two circuit board traces thereby indicating the key's release. Accordingly, each snap-dome based switch is transitionable between an undepressed/deactivated state and a depressed/activated state.

The processor 204 may be configured to collect and store data generated by the display 208 (which may be a touch screen display), dome switch keypad 210, optional pressure sensor 212, I/O device(s) 214 and/or external devices (not shown). Data stored in memory 206 can include, but is not limited to, information defining criteria for triggering a dive mode timer 222, information defining criteria for triggering a dive depth timer 224, threshold values, sensor data, switch state data and any other information which facilitates an accurate determination as to when maintenance of the communication device 100 is needed.

The processor 204 can perform actions involving access to and use of memory 206 on which is stored one or more sets of instructions 250 (e.g., software code) configured to implement one or more of the methodologies, procedures, or functions described herein. The instructions 250 can also reside, completely or at least partially, within the processor 250 during execution thereof by the processor. As such, the memory 206 and the processor 204 can comprise machine-readable media. The term "machine-readable media", as used here, refers to a single medium or multiple media that store the one or more sets of instructions 250. The term "machine-readable media", as used here, also refers to any medium that is capable of storing, encoding or carrying a set of instructions 250 for execution by the processor 204 that cause such device to perform any one or more of the methodologies of the present disclosure.

The I/O device(s) 214 include(s), but is(are) not limited to, a plurality of user depressible buttons, user actuatable knobs (e.g., rotary knobs), sensor(s), microphone(s), speaker(s), camera(s), Light Emitting Diodes ("LEDs"), and/or vibrator(s). The I/O device(s) 214 may be used, for example, for entering numerical inputs, selecting various functions of the communication device 100, and/or outputting information (e.g., alerts and notifications that maintenance of the communication device is needed). The depressible buttons of the I/O device(s) 214 may be configured as a keypad and may be part of the dome switch keypad 210.

A battery 216 or other power source may be provided for powering the components of the communication device 100. The battery 216 may comprise a rechargeable and/or replaceable battery. The battery 216 may be recharged via an energy harvesting circuit (not shown). Batteries and energy harvesting circuits are well known in the art, and therefore will not be discussed here.

The communication device architecture shown in FIG. 2 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

In order to facilitate an accurate determination as to when maintenance of the communication device 100 is needed, the communication device uses simultaneous keypad snap-dome activation by hydrostatic pressure to trigger the dive depth counter 224. The processor 204 starts the dive depth counter 224 when the communication device 100 is in a dive mode and buttons of the keypad dome switch 210 and/or I/O device(s) is(are) activated by hydrostatic pressure. The dive depth counter 224 tracks the amount of time that the communication device 100 is immersed below a depth of interest. The tracked amount of time can be viewed by a user via the display 208 or other output means (e.g., a digital or mechanical clock component). A user may be alerted or otherwise notified of a maintenance need for one or more fatigued components of the communication device 100 when the amount of time exceeds one or more pre-defined threshold values. The dive depth counter 224 may be reset once the maintenance of the communication device 100 is performed. The dive depth counter information and/or maintenance information associated with the communication device 100 may also be communicated to an external device (e.g., a remote server) for further analysis and/or use with other communication devices.

The present solution has many novel features. For example, the present solution uses keypad hardware 210 to detect when a communication device 100 achieves a depth of interest. This detection is made when snap-domes of the keypad dome switch 210 are actuated at the same time due to hydrostatic pressure while the communication device 100 is in a dive mode. Additionally or alternatively, the pressure sensor 212 can be used to facilitate such a detection. The snap-dome activation force can be designed or customized to specify the depth at which the dive depth counter 224 is to be activated.

The present solution provides an intuitive dive counter that leads to accurate maintenance on fatigued communication device parts. Currently, time spent at immersed depths is not tracked by conventional communication devices. The only tracking performed by conventional communication devices is based on when the same enter into their dive modes. Correlating the time spent in dive mode and the time spent immersed in water below a given depth can provide important information about end users that can be used to improve operations and/or architectures of communication devices with immersion requirements.

Figure 3:
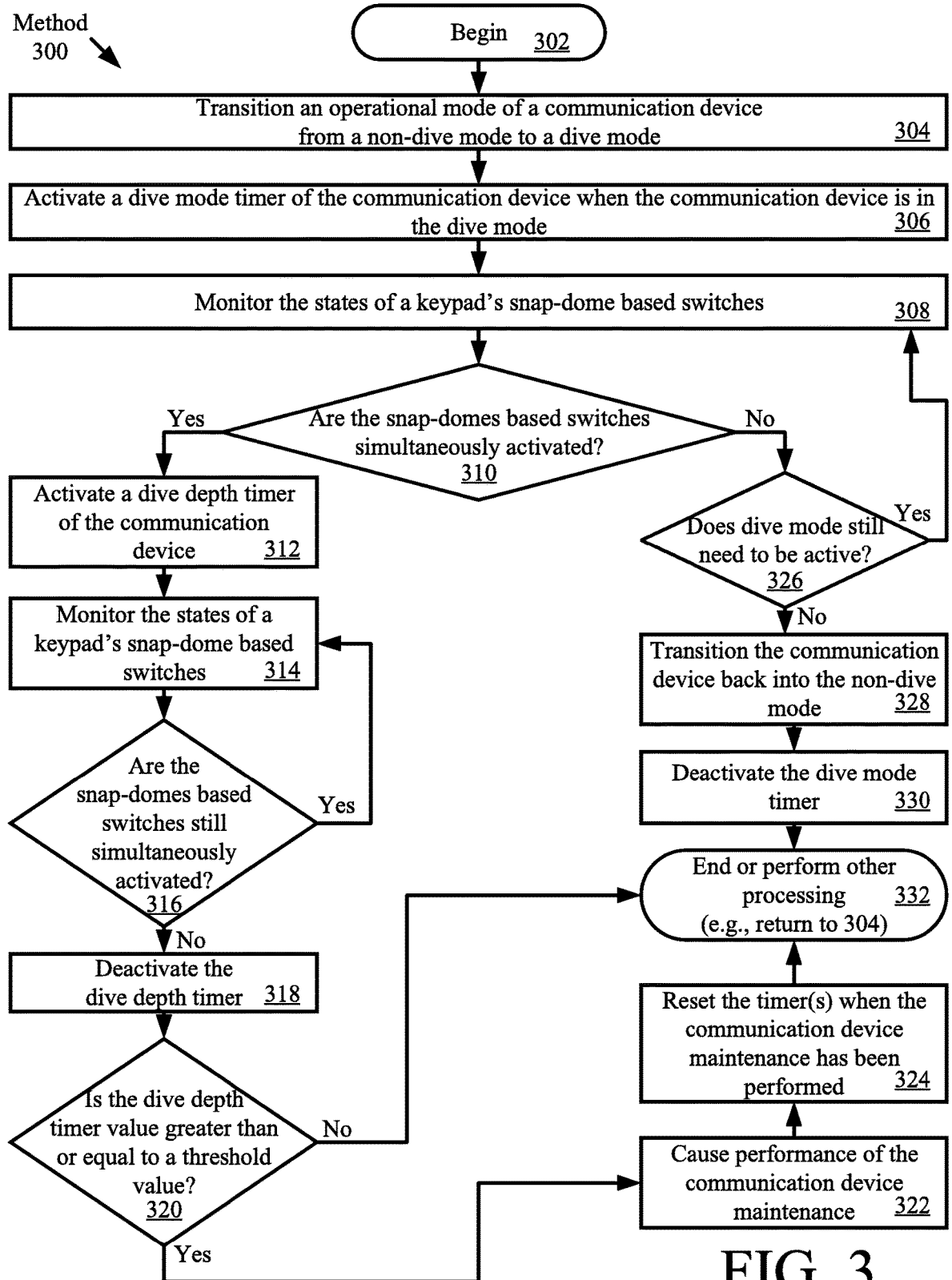
FIG. 3 is a flow diagram of an illustrative method for operating a communication device.

Referring now to FIG. 3, there is provided a flow diagram of an illustrative method 300 for operating a communication device (e.g., communication device 100 of FIGS. 1-2). Method 300 begins with 302 and continues with 304 where an operational mode of the communication device is transitioned from a non-dive mode to a dive mode. The non-dive mode may comprise any operational mode in which dive timing operations of the communication device are disabled and/or power is supplied to I/O devices of the communication device. The dive mode comprises an operational mode in which dive timing operations of the communication device are or are to be enabled. The dive timing operations can include, but are not limited to, the tracking of a total amount of time that the communication device is in a dive mode, and/or the discontinuing the supply of power to I/O devices of the communication device. The operational mode transition can be triggered in various ways. For example, an operational mode transition is triggered in response to a user-software interaction received by the communication device and/or based on sensor data (e.g., sensor data indicating an amount of moisture in a surrounding environment). The user-software interaction may be facilitated by I/O devices (e.g., devices 208, 210 and/or 214 of FIG. 2). The transition of operational modes can be achieved by a processor (e.g., processor 204 of FIG. 2) via a change of one or more operational mode parameter values stored in an internal memory (e.g., memory 206 of FIG. 2) of the communication device. For example, one or more operational mode parameter values can be set to zero or one. The present solution is not limited to the particulars of this example.

In response to the communication device's transition into the dive mode, a dive mode timer (e.g., dive mode timer 222 of FIG. 2) is activated by the processor as shown by 306. The dive mode timer comprises a clock for tracking an amount of time in which the communication device is in the dive mode. Clocks are well known in the art, and therefore will not be described herein.

Next in 308, the states of a keypad's snap-dome based switches are monitored by the processor. As noted above, each of the snap-dome based switches of the keypad (e.g., dome switch keypad 210 of FIG. 2) has two states: an undepressed or deactivated state; and a depressed or activated state. If the snap-dome based switches are not simultaneously activated [310:NO], then method 300 continues with 326. If the dive mode needs to still be active [326:YES], then method 300 returns to 308. The determination of 326 as to whether or not the dive mode needs to still be active can be based on time information (e.g., has a pre-defined period of time passed since transitioning to dive mode), user-software interactions (e.g., a user uses a button or widget to turn off dive mode), and/or sensor data (e.g., sensor data specifying an amount of moisture in a surrounding environment that falls below a threshold value). In contrast, if the dive mode does not need to still be active [326:NO], then method continues with 328-330. 328-330 involve: transitioning the communication device back into the non-dive mode; and deactivating the dive mode timer. Subsequently, 332 is performed where method 300 ends or other processing is performed (e.g., return to 304).

If the snap-dome based switches are simultaneously activated [310:YES], then method 300 continues with 312-314. 312-314 involve: activating a dive depth timer of the communication device (e.g., dive depth timer 224 of FIG. 2); and monitoring the states of a keypad's snap-dome based switches. The dive depth timer comprises a clock for tracking an amount of time in which the communication device is immersed in water at given depths (e.g., depths greater than or equal to ten meters) during a single immersion event or a plurality of immersion events. Clocks are well known in the art, and therefore will not be described herein. When the keypad's snap-dome based switches are no longer simultaneously activated [316:NO], the dive depth timer is deactivated as shown by 318.

Next in 320, a determination is made as to whether the dive depth timer value is greater than or equal to a threshold value. The threshold value is selected in accordance with the maximum amount of time at least one pressure sensitive component of the communication device (e.g., pressure sensitive component 220 of FIG. 2) can be immersed in water at given depths (e.g., ten-twenty meters) without experiencing fatigue (e.g., mechanical deformation or material wear and tear), failure (e.g., material rupture, puncture, rip, tear, etc.) or erasure (e.g., electronic component erasure or loss of functionality). The pressure sensitive component(s) can include(s), but is(are) not limited to, a pressure vent, a seal, and/or a breathing ports/vent.

If the dive depth timer value is less than the threshold value [320:NO], then 332 is performed where method 300 ends or other processing is performed (e.g., return to 304). In contrast, if the dive depth time value is greater than or equal to the threshold value [320: YES], then 322 is performed where the processor performs operations to cause the communication device maintenance to be performed. These operations can include, but are not limited to, causing an output of an indicator indicating a need for communication device maintenance, causing software to be loaded from a local non-volatile memory device to a volatile memory device, and/or causing software to be downloaded from a remote site to the communication device. The indication can include, but is not limited to, an auditory indication, a visual indication and/or a tactile indication. For example, the indication comprises emitted light, an electronic message (e.g., a displayed text message or icon), a sound, and/or a vibration.

The dive mode timer and the dive depth timer are reset when the communication device maintenance has been performed, as shown by 324. Upon completing 324, 332 is performed where method 300 ends or other processing is performed (e.g., return to 304).

As evident from the above discussion, the present solution enables users of communication devices to track immersion times at depths of interest (e.g., depths equal to and greater than ten meters) to properly schedule maintenance of components that fatigue due to extreme hydrostatic pressures of surrounding water. The present solution also limits uncertainty of dive capabilities and protects communication devices from water ingress throughout their life cycles. The present solution also provides a means to track data of fielded communication devices to understand the actual use thereof in dive situations.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for operating a communication device, comprising:
    monitoring, by the processor, states of snap-dome based switches of a keypad provided with the communication device;
    activating, by the processor, a first timer when the snap-dome based switches are simultaneously activated;
    detecting, by the processor, when maintenance of the communication device is needed based on a value of the first timer; and
    causing, by the processor, performance of communication device maintenance based on the detecting.

2. The method according to claim 1, wherein the first timer comprises a clock for tracking an amount of time in which the communication device is immersed in water at given depths during a single immersion event or during a plurality of consecutive immersion events.

3. The method according to claim 1, wherein a detection is made that the maintenance is needed when the value of the first timer is greater than or equal to a threshold value, the threshold value being selected in accordance with a maximum amount of time at least one pressure sensitive component of the communication device can be immersed in water at given depths without experiencing fatigue, failure or erasure.

4. The method according to claim 1, further comprising transitioning the communication device from a non-dive mode in which dive timing operations of the communication device are disabled to the dive mode in which dive timing operations of the communication device are to be enabled.

5. The method according to claim 4, further comprising activating a second timer in response to said transitioning.

6. The method according to claim 5, wherein the first timer comprises a clock for tracking an amount of time in which the communication device is immersed in water at given depths, and the second timer comprises a clock for tracking an amount of time in which the communication device is in the dive mode.

7. The method according to claim 5, further comprising:
deactivating the first timer when the snap-dome based switches are no longer simultaneously activated; and
deactivating the second timer when the communication device is transitioned from the dive mode.

8. The method according to claim 7, further comprising resetting the first and second timers when the communication device maintenance has been performed.

9. The method according to claim 4, wherein the first timer is activated when the communication device is in the dive mode and the snap-dome based switches are simultaneously activated.

10. The method according to claim 1, further comprising deactivating the first timer when the snap-dome based switches are no longer simultaneously activated.

11. The method according to claim 1, further comprising re-setting the first timer when the communication device maintenance has been performed.

12. A communication device, comprising:
a processor; and
a non-transitory computer-readable storage medium comprising programming instructions that are configured to cause the processor to implement a method for operating a communication device, wherein the programming instructions comprise instructions to:
monitor states of snap-dome based switches of a keypad provided with the communication device;
activate a first timer when the snap-dome based switches are simultaneously activated;
detect when maintenance of the communication device is needed based on a value of the first timer; and
cause performance of communication device maintenance based on the detecting.

13. The communication device according to claim 12, wherein the first timer comprises a clock for tracking an amount of time in which the communication device is immersed in water at given depths during a single immersion event or during a plurality of consecutive immersion events.

14. The communication device according to claim 12, wherein a detection is made that the maintenance is needed when the value of the first timer is greater than or equal to a threshold value, the threshold value being selected in accordance with a maximum amount of time at least one pressure sensitive component of the communication device can be immersed in water at given depths without experiencing fatigue, failure or erasure.

15. The communication device according to claim 12, wherein the programming instructions further cause the processor to transition the communication device from a non-dive mode in which dive timing operations of the communication device are disabled to the dive mode in which dive timing operations of the communication device are to be enabled.

16. The communication device according to claim 15, wherein the programming instructions further cause the processor to activate a second timer in response to said transitioning.

17. The communication device according to claim 16, wherein the first timer comprises a clock for tracking an amount of time in which the communication device is immersed in water at given depths, and the second timer comprises a clock for tracking an amount of time in which the communication device is in the dive mode.

18. The communication device according to claim 16, wherein the programming instructions further cause the processor to:
deactivate the first timer when the snap-dome based switches are no longer simultaneously activated; and
deactivate the second timer when the communication device is transitioned from the dive mode.

19. The communication device according to claim 18, wherein the first and second timers are reset when the communication device maintenance has been performed.

20. The communication device according to claim 15, wherein the first timer is activated when the communication device is in the dive mode and the snap-dome based switches are simultaneously activated.

21. The communication device according to claim 12, wherein the programming instructions further cause the processor to deactivate the first timer when the snap-dome based switches are no longer simultaneously activated.

22. The communication device according to claim 12, wherein the first timer is reset when the communication device maintenance has been performed.

* * * * *